Dec. 2, 1930.  R. L. STOCKARD  1,783,860
LAP LINK
Filed June 21, 1928
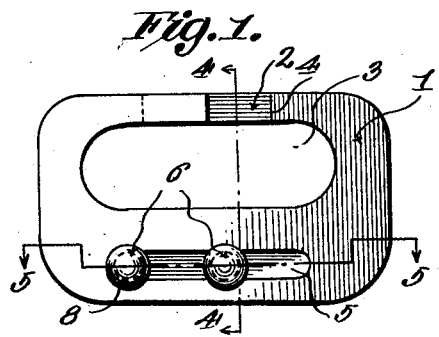
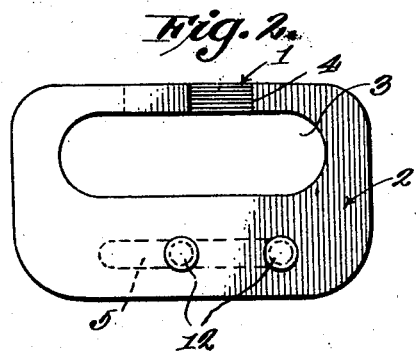
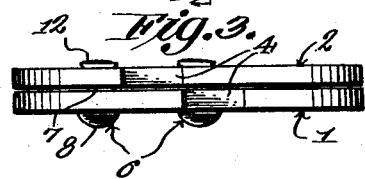
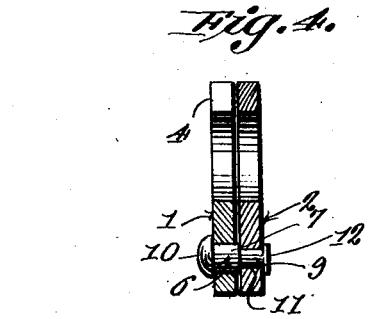
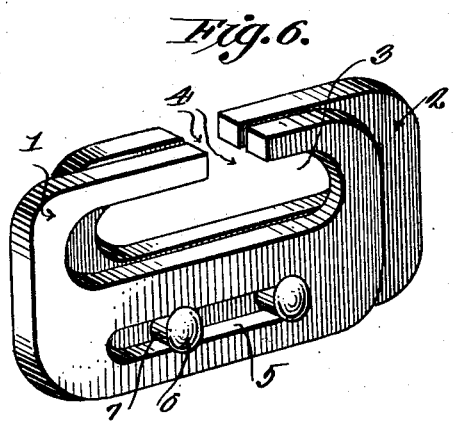
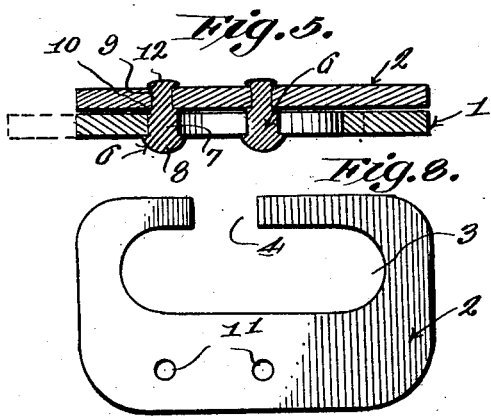
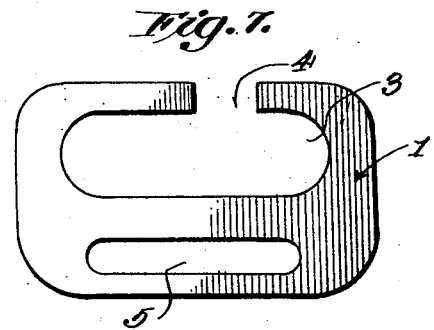
INVENTOR.
RICHARD L. STOCKARD
BY
Irving L. McCathran
ATTORNEYS.

Patented Dec. 2, 1930

1,783,860

UNITED STATES PATENT OFFICE

RICHARD L. STOCKARD, OF FORREST CITY, ARKANSAS

LAP LINK

Application filed June 21, 1928. Serial No. 287,285.

This invention relates to improvements in lap links and one of the objects of the present invention is to provide a lap link which is well adapted for all of the uses to which lap links are ordinarily put and which will possess a greater degree of strength than links of this type previously employed and therefore capable of serving its purpose as a connecting link, also in connecting a chain, without any likelihood of breakage or any separation or disarrangement of its component parts such as would impair its efficiency.

One objection found to the use of lap links as heretofore constructed, is that the members of such a link are not connected in a substantial manner which will insure against breakage of the link at its weak parts or a disarrangement or distortion of the link members, and therefore the present invention has as a further object to provide a lap link in which the link members are so formed and the connection provided between the members is of such a nature that there can be no separation of the link members and no distortion thereof and the connection between the link members is a reinforced one thus insuring of great strength where the greatest strain is imposed.

Another objection which is found for lap links as ordinarily constructed is that the elements which connect the link members are ordinarily of such a type or so formed that they are subject to great stress in the use of the link and are liable to become broken or so distorted as to relatively lock or bind the link members and prevent their proper relative movement to open and closed position. Therefore the present invention has as a further object to provide, in a lap link, a novel form of connecting element and a novel arrangement of the same with respect to the two link members which will insure against any binding or locking of the members and likewise insure against any undue strain being imposed upon the elements which would otherwise tend to distort the same or cause fracture thereof.

While the accompanying drawing and the description which is to follow, constitute a disclosure of the preferred embodiment of the invention, it will be understood that various changes may be made within the scope of what is claimed, such as in the length, width and thickness of the link.

In the accompanying drawing:

Figure 1 is a view in side elevation of a lap link constructed in accordance with the invention, the link being shown closed;

Figure 2 is a similar view looking at the opposite side of the link;

Figure 3 is a plan view of the link, closed;

Figure 4 is a vertical transverse sectional view taken substantially on the line 4—4 of Figure 1 looking in the direction indicated by the arrows;

Figure 5 is a horizontal sectional view taken substantially on the line 5—5 of Figure 1 looking in the direction indicated by the arrows;

Figure 6 is a perspective view of the link in open condition;

Figure 7 is a view in side elevation of one member of the link;

Figure 8 is a similar view of the other member of the link.

The link, as is usual, in links of this type, comprises a pair of members and in the drawing, the members are indicated in general one by the numeral 1 and the other by the numeral 2 and each comprises a flat sided substantially oblong rectangular body preferably having its corners rounded so as not to present sharp corners to the parts with which the link of the invention is associated. The members 1 and 2 are each formed with a longitudinally extending link receiving opening 3 which is parallel to one longitudinal edge of the body of the link member and located nearer said edge than the other or opposite edge. As illustrated in the several figures, the end walls of the opening 3 are of substantially semi-circular form so as to provide for freedom of movement of the links which are engaged in these openings. The body of each link member is likewise formed, in its longitudinal edge adjacent which the opening 3 is located, with an opening 4 which communicates with the opening 3 near one end thereof and at this point it will be noted that, when the link members 1 and 2 are assembled face to face, they will be so relatively positioned that when they assume positions in marginal registration with each other, their openings 4 will be out of registration and consequently both closed and, when they are shifted to a longitudinally displaced relation these openings may register to provide for the engagement of the parts to be connected in the openings 3 in the two members.

The link member 1 is formed in its body parallel to the opening 3 and that longitudinal edge of the body opposite the one near which the opening 3 is located, with a longitudinally extending slot 5 the end walls of which are preferably of semi-circular form. The two members 1 and 2 of the link are connected by a pair of pins which are indicated in general by the numeral 6, and each of these pins comprises a shank 7 formed at one end with a rounded head 8 and reduced in diameter at its other end as indicated by the numeral 9 thus forming a circumscribing shoulder 10 located substantially midway between the ends of the shank, and as will be observed by reference to Figures 4 and 5 of the drawing the body of the member 2 is formed with openings 11 one located near one end of the body and the other approximately midway between the ends of the body, and the reduced ends 9 of the pins 6 are fitted into these openings and the ends are headed as indicated by the numeral 12, the portions of the pin shanks which are of greater diameter having been first fitted through the slots 5 in the member 1. As shown in Figures 4 and 5 of the drawing, the pins are so secured to the member 2 that their shoulders 10 will bind against one face of the member and their riveted ends 12 will bind against the other face of the member and it will likewise be observed by reference to these figures that the length of the pin shank portions which are of greater diameter is greater than the thickness of the body of the member 1 of the link so that the member 1 is not caused to bind against the member 2 but is merely held in facial engagement therewith and the two members are capable of relative sliding movement due to the fact that the pins are spaced apart a distance less than the length of the slot 5 through which they extend. It will be evident that there is no strain whatsoever imposed upon the pins 6 as their sole purpose is to maintain the sections 1 and 2 assembled.

It will now be evident by reference to the drawing and a comparison of Figures 1 and 6 thereof that when the link members 1 and 2 are so relatively adjusted that they are in marginal registration with each other, one of the pins 6 will engage in one end of the slot 5 and the openings 4 of the members 1 and 2 will be out of registration and the link will be closed, as shown in Figures 1, 2 and 3 of the drawing. On the other hand it will be observed that when the members 1 and 2 are relatively longitudinally displaced so that the other pin 6 engages in the other end of the slot 5, the openings 4 in the two members will be brought into registration with each other as illustrated in Figure 6 of the drawing so that the link will be open and one or more parts to be connected may be engaged therewith after which the sections may be again relatively adjusted so as to close the link.

By considering the drawing, it will be seen that the side of the lap link which is provided with the connecting means is of much greater width than the side which is provided with the link receiving opening, thereby greatly strengthening the lap link at a point where the sections of the lap link are connected together.

By reference to Figure 3 of the drawing it will be observed that the openings 4 in the longitudinal edges of the two members are so relatively located, in the assembled relation of the members, that one side wall of the opening in each member will be located substantially midway between the ends of the member and, as a consequence, when the link is closed relatively opposite walls of the two openings will be brought to position substantially opposite each other. Therefore it is possible, by so arranging and locating the openings and proportioning and arranging the slot 5 and the pins 6, to connect the members for relative sliding displacement for a minimum distance in order to provide for engagement of the parts to be connected with the link of the invention and consequently the distance which the two members must be relatively shifted or displaced is reduced to the minimum.

It will also be evident that by locating the connection for the two members in that portion of the members which is located between the opening 3 and the longitudinal edge opposite the edge in which the opening 4 is formed, an exceptionally substantial connection of the members is provided for and the link is therefore greatly strengthened and reinforced.

Having thus described the invention, what I claim is:

1. As an article of manufacture, a pair of similarly constructed link members, each member being elongated and consisting of parallel sides and ends, one side having an opening, the other side being considerably and uniformly broadened throughout its entire length, thus giving strength to the ends, the broadened side of one link member having a slot therein, and headed pins extending through said slot and being carried by the broadened side of the remaining link member, thus slidably connecting said members together, as and for the purposes set forth.

2. As an article of manufacture, a pair of similarly constructed link members, each member being elongated and consisting of sides and ends, one side of each member having an opening, the remaining side of one member having a slot therein, headed pins passing through said slot and having reduced portions carried by the remaining side portion of the other link member, thus forming shoulders intermediate the ends of the pins, whereby the shoulders will limit the extension of the pins into the member supporting them, thus providing space for the members to slide with respect to each other without binding action, as and for the purposes set forth.

In testimony whereof I affix my signature.

RICHARD L. STOCKARD.